(12) United States Patent
Allen et al.

(10) Patent No.: US 9,135,146 B1
(45) Date of Patent: Sep. 15, 2015

(54) IDENTIFYING AND RESOLVING SOFTWARE ISSUES

(71) Applicant: Amazon Technologies, Inc., Seattle, WA (US)

(72) Inventors: Nicholas Alexander Allen, Seattle, WA (US); Andrew Thomas Troutman, Seattle, WA (US); Joshua William McFarlane, Seattle, WA (US); Matthew Roy Noble, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 135 days.

(21) Appl. No.: 14/073,361

(22) Filed: Nov. 6, 2013

(51) Int. Cl.
G06F 9/44 (2006.01)
G06F 11/36 (2006.01)

(52) U.S. Cl.
CPC .................. G06F 11/366 (2013.01)

(58) Field of Classification Search
USPC ........................................................ 717/130
See application file for complete search history.

(56) References Cited

U.S. PATENT DOCUMENTS

2009/0094590 A1* 4/2009 Mendelson et al. .......... 717/156

OTHER PUBLICATIONS

Chacon, S. "Pro Git" published by Apress [online][retrieved on Dec. 12, 2013] retrieved from: http://martinez.io/git-distributed-even-if-your-workflow-isnt, 10 pps.

* cited by examiner

Primary Examiner — John Chavis
(74) Attorney, Agent, or Firm — Lee & Hayes, PLLC

(57) ABSTRACT

Technologies are described herein for use in identifying and resolving software issues. One or more corrective actions may be identified and taken that are based upon the similarity between an unresolved issue and one or more resolved issues and/or upon the similarity between code changes made to resolve similar previously resolved issues. A version control graph might also be utilized to determine if a change made to resolve an issue in one branch of a software component is applicable to another branch of the software component. The version control graph might also be utilized to compute the relevance of an entry in an issue tracking system for an issue at a point in time after the entry is created in the issue tracking system.

20 Claims, 8 Drawing Sheets

IDENTIFYING AND RESOLVING SOFTWARE ISSUES

BACKGROUND

Software developers commonly utilize many different types of tools during the development of a software application. For example, software developers might utilize tools for editing source code and for compiling the source code into executable code. In addition to these tools, software developers might also utilize other types of utility programs to assist with the development of an application. For example, a developer might utilize a version control system ("VCS") to manage changes made to the source code and other components of the application.

In addition to a VCS, software developers might also utilize various software development workflow systems to manage the workflow of program development. For example, a developer might utilize an issue tracking system to track issues (which might also be referred to as "defects" or "bugs") within the program being developed. A developer might also utilize other software development workflow systems in conjunction with the development of a program.

Even using the various tools described above, the identification and resolution of issues present within software components can be an extremely difficult and often labor-intensive process. It is with respect to these and other considerations that the disclosure made herein is presented.

DETAILED DESCRIPTION

Figure 1:
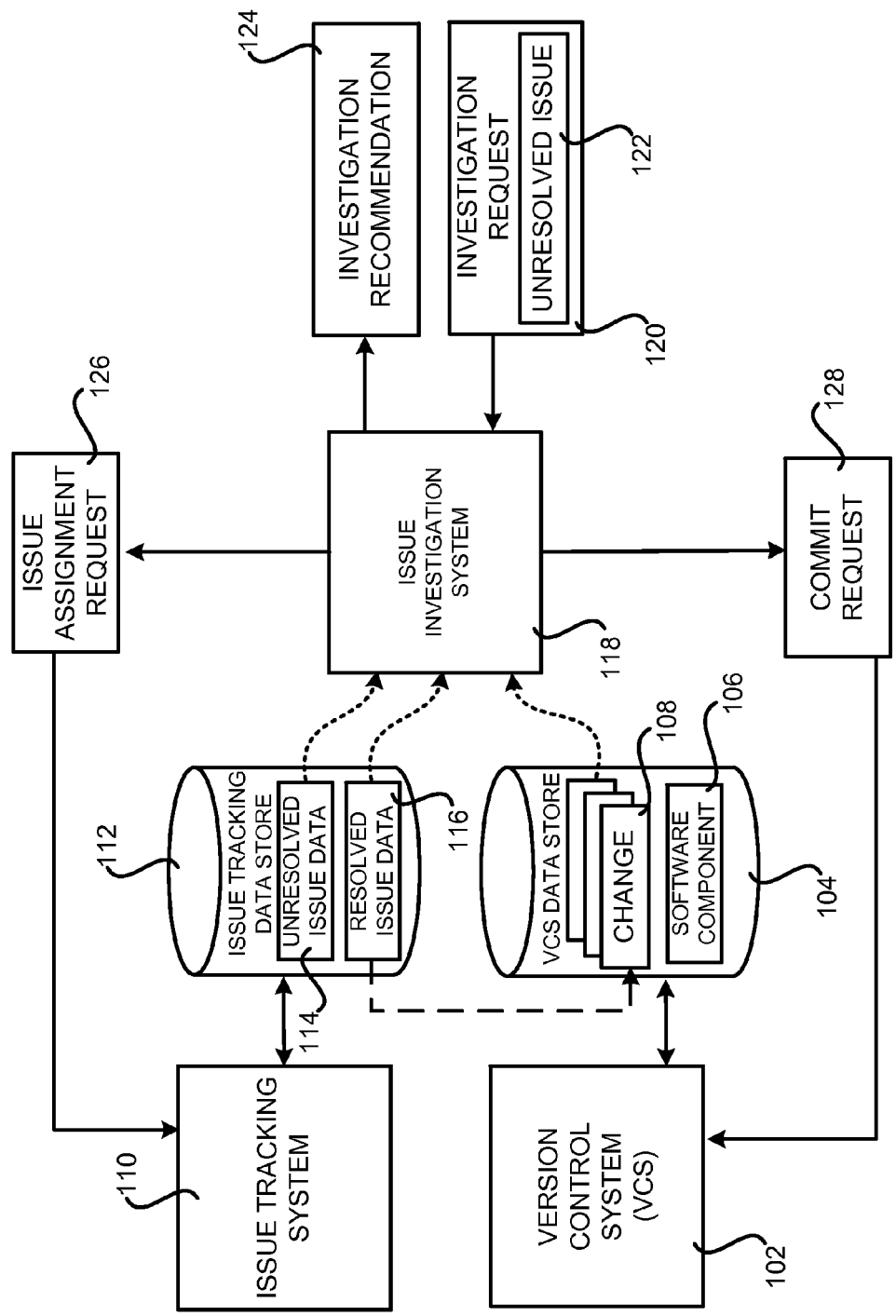
FIG. 1 is a system diagram showing aspects of a mechanism presented herein for investigating an unresolved software issue and for taking corrective action with regard to the unresolved software issue, including several software and hardware components utilized in embodiments disclosed herein.

The following detailed description is directed to various technologies for use by a developer in resolving software issues. In particular, technologies are provided for investigating an unresolved software issue and for taking one or more corrective actions based upon the results of the investigation. The investigation may include identifying changes made to resolve a previously resolved issue that is similar to the unresolved issue. The investigation might also include identifying similar changes made to resolve similar previously resolved issues. The results of the investigation may be utilized to take one or more corrective actions. For example, and without limitation, the corrective actions may include providing a notification to a developer identifying the changes made to resolve similar previously resolved issues, assigning the unresolved issue to a developer such as the developer that resolved a similar previously resolved issue in an issue tracking system or the developer that created the entry for the previously resolved issue, generating a commit to the unresolved issue with the changes made to resolve the previously resolved issue, and/or performing one or more automated tests to determine if the changes made to resolve the previously resolved issue also resolve the unresolved issue. Other corrective actions might also be performed. Additional details regarding this mechanism are provided below with regard to FIGS. 1 and 2.

Technologies are also provided for determining if a change made to resolve an issue in one branch of a software component is applicable to another branch of the software component. In order to provide this functionality, a version control graph is maintained that identifies relationships between different branches of a software component. For example, the version control graph might identify linear sequences of changes of the software component. The version control graph may be utilized to determine when a change made to a first branch of the software component to resolve an issue may be applicable to a point in a second branch of the software component. If the change to the first branch of the software component is determined to be applicable to the second branch, the change may be automatically applied to the second branch, an entry might be created for the issue on the second branch in an issue tracking system, and/or other types of actions might be taken. If the change to the first branch of the software component is not applicable to the second branch, an entry in an issue tracking system for the issue that is associated with the second branch might be closed if present and/or other types of actions might be taken. Additional details regarding this mechanism are provided below with regard to FIGS. 3-5.

Technologies are also provided for calculating the relevance of an entry (which might be referred to herein as a "defect report") for an issue in an issue tracking system at a point in time after the entry is created. In order to provide this functionality, an entry is created in an issue tracking system for an issue identified in a software component. Additionally, one or more locations (e.g. files or ranges of source code lines) in the software component are associated with the entry in the issue tracking system. In order to determine the relevance of the entry at a point in time after the entry is created, one or more changes made to the locations associated with the entry after the creation of the entry are identified and evaluated. A version control graph maintained by a version control system might be utilized to identify the changes. A "staleness" score is then computed based upon the type of changes made to the locations in the software component following the creation of the entry for the issue. The staleness score provides a measure of the relevance of the entry in the issue tracking system at a point in time after the entry was created. Various functions may then be performed based upon the staleness score such as, but not limited to, removing the entry from the issue tracking system if the staleness score meets a threshold value, modifying the locations associated with the entry in the issue tracking system, initiating an evaluation of the entry, providing a user interface for presenting the staleness score and/or modifying a priority associated with the entry in the issue tracking system. Additional details regarding this mechanism are provided below with regard to FIGS. 6 and 7.

It should be appreciated that the subject matter presented herein may be implemented as a computer process, an electronic computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, cellular telephone devices, electronic-book readers, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 is a system diagram showing aspects of the operation of a mechanism presented herein for investigating an unresolved software issue and for taking corrective action with regard to the unresolved software issue, including several software and hardware components utilized in embodiments disclosed herein. In one particular implementation, data maintained by a version control system ("VCS") 102 and by an issue tracking system 110 is utilized to investigate an unresolved software issue and to take one or more corrective actions with regard to the unresolved issue based upon the results of the investigation.

As discussed briefly above, a VCS 102 provides functionality for managing changes made to source code files and other types of files associated with a program (referred to herein as "software components 106"). One specific example of a VCS 102 is the GIT open source distributed version control and source code management system. The VCS 102 may store the software components 106 in a VCS data store 104, which might also be referred to herein as a "source code repository." The VCS data store 104 might also be utilized to store data describing changes 108 that have been made to a software component 106 maintained by the VCS 102. The VCS data store 104 might also be utilized to store other types of data and/or metadata regarding the creation and modification of a software component 106.

As shown in FIG. 1, the VCS 102 might also be utilized in conjunction with one or more other software development workflow systems, such as an issue tracking system 110. As discussed briefly above, the issue tracking system 110 provides functionality for creating and managing entries for tracking issues that have been identified within a program being developed. For example, and without limitation, the issue tracking system 110 might maintain an issue tracking data store 112 for storing entries associated with issues that have been resolved in a software component 106 (referred to herein as "resolved issue data 116") and entries associated with issues that currently exist in a software component 106 (referred to herein as "unresolved issue data 114").

The resolved issue data 116 and the unresolved issue data 114 include data describing various characteristics of resolved issues and unresolved issues, respectively, in software components 106 maintained by the VCS 102. For example, and without limitation, the resolved issue data 116 and the unresolved issue data 114 might include data describing failed test cases associated with a resolved or unresolved issue, one or more stack traces associated with a resolved or unresolved issue, a human-generated text description of a resolved issue or an unresolved issue, and/or data identifying one or more conditions under which a resolved issue or an unresolved issue occurs. The resolved issue data 116 and the unresolved issue data 114 might also include data and/or metadata describing other characteristics of resolved issues and unresolved issues, respectively, in other embodiments.

The resolved issue data 114 and the unresolved issue data 116 also include data identifying the particular software component 106, or components 106, within the VCS 102 in which the corresponding issue resides. Additionally, and as shown in FIG. 1, the resolved issue data 116 might also identify one or more changes 108 that were made in order to resolve an issue within a particular software component 106. For example, and without limitation, if certain lines of program code were modified in order to resolve an issue, the resolved issue data 116 for the issue might identify the particular lines of code in the software component 106 that were modified in order to resolve the issue. Other types of changes 108 that resolved an issue in a software component 106 might also be identified in a similar manner. The resolved issue data 114 and unresolved issue data 115 might be stored in entries, or defect reports, maintained by the issue tracking system 110.

As described briefly above, one embodiment described herein provides technologies for investigation an unresolved issue within a software component 106 and for taking one or more corrective actions based upon the results of the investigation. An issue investigation system 118 provides this functionality in one particular implementation. It should be appreciated, however, that the functionality described herein as being performed by the issue investigation system 118 might also be performed by the VCS 102, by the issue tracking system 110, or by another component, system, or combination of systems altogether. In this regard, it should also be appreciated that although a VCS 102 and an issue tracking system 110 have been illustrated in FIG. 1, the embodiments disclosed herein might also be utilized with other types of software development workflow systems.

In one implementation, the issue investigation system 118 is configured to receive an investigation request 120. The investigation request 120 is a request to perform an investigation for potential solutions to a particular unresolved issue 122 maintained by the issue tracking system 110. The investigation request 120 might be generated by a software developer and provided to the issue investigation system 118 by way of an appropriate user interface ("UI"), through an application programming interface ("API") or in another manner.

In response to receiving an investigation request 120, the issue investigation system 118 is configured to perform an investigation to identify changes 108 made in order to resolve previously resolved issues that may be suitable for use in resolving the unresolved issue 122. The issue investigation system 118 is also configured to take one or more corrective actions based upon the results of the investigation. For example, and without limitation, the issue investigation system 118 might identify one or more changes 108 in the VCS 102 that were made in order to resolve issues that were similar to the unresolved issue 122 identified in the investigation request 120. An investigation recommendation 124 may then be transmitted to a developer (e.g. an email message or other type of notification) that identifies the changes. The developer can then investigate the changes 108 identified in the recommendation 124 as potential resolutions of the unresolved issue 122 with the software component 106. The issue investigation system 118 might also take other types of corrective actions, which are described in greater detail below.

In order to perform the investigation described briefly above, the issue investigation recommendation system 118 obtains data describing the characteristics of the unresolved issue 122 with the software component 106. For example, and without limitation, the issue investigation system 118 might obtain unresolved issue data 114 from the issue tracking system 110 associated with the unresolved issue 122. As discussed briefly above, the unresolved issue data 114 might include, but is not limited to, failed test cases associated with the unresolved issue 122, one or more stack traces associated with the unresolved issue 122, a text description of the unresolved issue 122, and/or data identifying one or more conditions under which the unresolved issue 122 occurs. Other types of data describing various characteristics of the unresolved issue 122 might also be obtained from the issue tracking system 110 and/or from another system, component, or location.

The issue investigation system 118 also obtains data describing the characteristics of one or more issues with the software component 106, or with another software component, that have been previously resolved. For example, and without limitation, the issue investigation system 118 might obtain the resolved issue data 116 from the issue tracking system 110 for the software component 106 and/or for another software component. As discussed briefly above, the resolved issue data 116 might include, but is not limited to, failed test cases associated with resolved issues, one or more stack traces associated with resolved issues, test cases added in response to having resolved a resolved issue, a text description of resolved issues, and/or data identifying one or more conditions under which resolved issues occurred. The resolved issue data 116 might also identify, for each resolved issue, the change 108, or changes 108, which were made in order to resolve the resolved issue. Other types of data describing resolved issues might also be obtained from the issue tracking system 110 and/or from another system, component, or location.

The issue investigation system 118 then utilizes the resolved issue data 116 and the unresolved issue data 114 to identify resolved issues that are similar to the unresolved issue 122. For example, and without limitation, the issue investigation system 118 may compare some or all of the characteristics of the unresolved issue 122 described above to the corresponding characteristics associated with previously resolved issues to compute a measure of the similarity between the unresolved issue 122 and the resolved issues. In this way, resolved issues can be identified that are similar to the unresolved issue 122. In some embodiments, only resolved issues having at least a threshold level of similarity with the unresolved issue 122 are identified and/or considered further in the manner described below.

Once the issue investigation system 118 has identified resolved issues that are similar to the unresolved issue 122, the issue investigation system 118 then identifies the changes 108 that were made in order to resolve each previously resolved issue that is similar to the unresolved issue 122. In some embodiments, the corrective actions taken by the issue investigation system 118 are identified based upon these changes 108. In other embodiments, however, another measure of similarity is computed in order to identify the particular changes 108 upon which corrective actions should be identified and taken. In particular, in some embodiments the similarity is determined between each of the changes 108 that were made in order to resolve each previously resolved issue that is similar to the unresolved issue 122. For example, and without limitation, the similarity between the changes 108 might be determined based upon the files associated with an issue that were changed in order to resolve the issue, the lines of program code that were changed in order to resolve an issue, the changes made to resolve the issue, software classes that were changed to resolve an issue, and/or the identity of the developer that resolved an issue.

Once the similarity between the changes 108 that were made in order to resolve each previously resolved issue that is similar to the unresolved issue 122 has been determined, the issue investigation recommendation system 118 might identify and take one or more corrective actions based upon the identified changes 108. For example, and without limitation, the issue investigation system 118 might generate and provide a recommendation 124 that identifies the changes 108 that are similar to one another. The investigation recommendation 124 might be provided as an email message, by way of a Web page, or in another manner.

In one implementation the issue investigation system 118 might identify changes 108 in the recommendation 124 that have a similarity with one another that is greater than a certain pre-defined threshold. The changes 108 might also be ordered based upon their similarity with one another and/or based upon the similarity between the unresolved issue 122 and the resolved issues associated with the identified changes 108. As mentioned above, a developer can then examine the changes 108 identified in the recommendation 124 as being possible resolutions to the unresolved issue 122.

In some embodiments, one or more other unresolved issues that are similar to the unresolved issue 122, and that have at least one associated change 108, might also be identified and presented in the recommendation 124. In some embodiments, the recommendation 124 also identifies one or more changes 108 made following a change 108 that resulted in the resolution of an issue. In this way, a developer can quickly identify changes made to a particular software component 108 following the resolution of an issue within the software component 108. The developer may then utilize the identified changes in the investigation of the unresolved issue 122. Additional details regarding the mechanism described with regard to FIG. 1 for investigating an unresolved software issue and for taking corrective action with regard to the unresolved software issue will be provided below with regard to FIG. 2.

The issue investigation system 118 might also take other corrective actions with regard to the unresolved issue 122 based upon the changes 108 identified in the manner described above. For example, the issue investigation system 118 might annotate the unresolved issue 122 in the issue tracking system 110 with data identifying the changes 108 that might be relevant to the unresolved issue 122. A developer can then access this information through the issue tracking system 110 when working on the unresolved issue 122. The issue investigation system 118 might also create an association in the issue tracking system 110 between the unresolved issue 122 and one or more other resolved or unresolved issues.

The issue investigation system 118 might also transmit an issue assignment request 126 to the issue tracking system 110 in order to assign the unresolved issue 122 to a particular developer. For example, the issue investigation system 118 might utilize data stored in the issue tracking data store 112 to identify a developer that resolved a resolved issue that that is similar to the unresolved issue 122. That developer might then be assigned to the unresolved issue 122 in the issue tracking system 110.

The issue investigation system 18 might also generate a commit request 128 to the VCS 102 in order to commit the changes 108 to a previously resolved issue to the unresolved issue 122. In this way, changes 108 identified as being relevant to an unresolved issue 122 can be automatically committed in an attempt to resolve the unresolved issue 122. A developer might also be given an opportunity to approve the commit request 128 before the commit occurs.

In some embodiments, the application of a commit to an unresolved issue 122 triggers an automated workflow for evaluating whether the commit resolved the unresolved issue 122. For example, various types of tests may be performed in order to determine whether the changes 108 identified in the manner described above solve the unresolved issue 122 when committed. If the changes 108 resolve the unresolved issue 122, the changes may be kept. If the changes 108 do not resolve the unresolved issue 122, the changes 108 may be rolled back. Various types of build time and runtime tests may be performed to determine whether a commit of the changes 108 resolves the unresolved issue 122. It should be appreciated that various corrective actions identified above are merely illustrative and that other types of corrective actions might be taken in other implementations.

Figure 2:
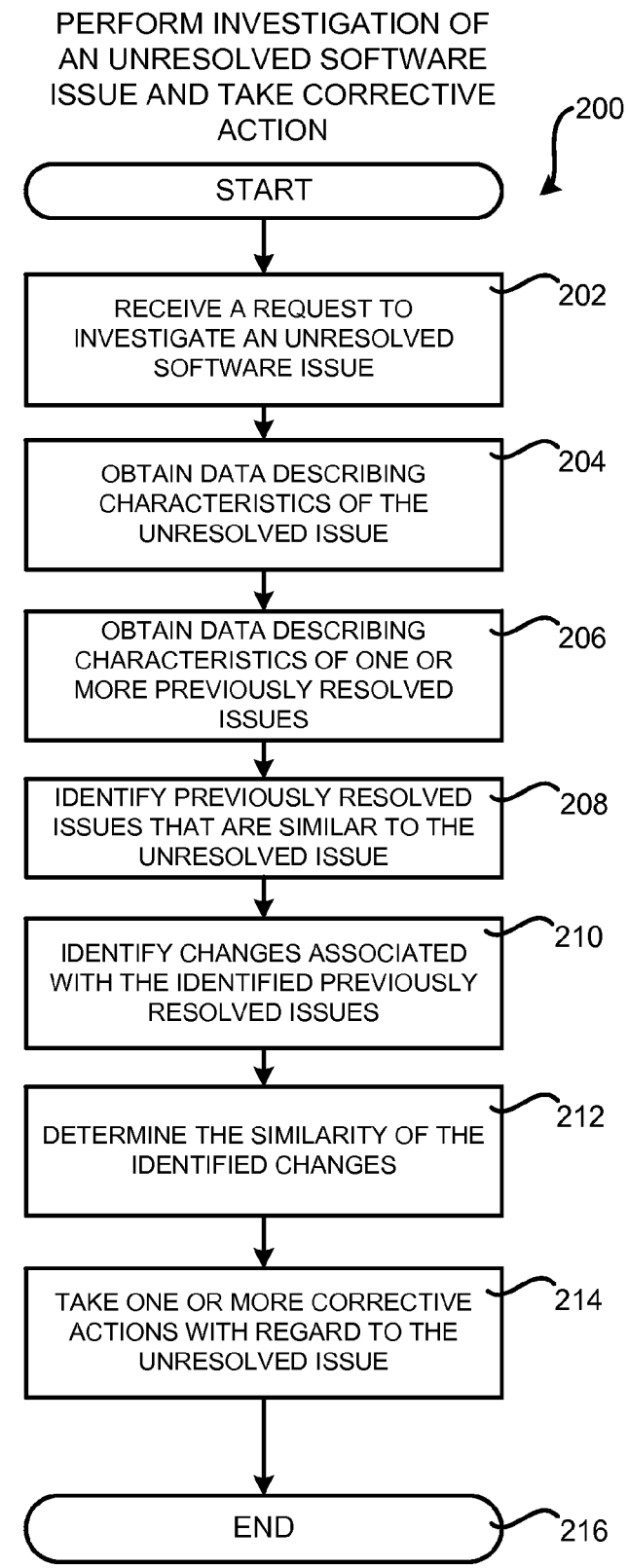
FIG. 2 is a flow diagram showing aspects of one illustrative routine disclosed herein for investigating an unresolved software issue and for taking corrective action with respect to the unresolved software issue, according to embodiments described herein.

FIG. 2 is a flow diagram showing aspects of one illustrative routine 200 disclosed herein for investigating an unresolved issue 122 and for taking one or more corrective actions with respect to the unresolved issue 122, according to embodiments described herein. It should be appreciated that the logical operations described herein with respect to FIG. 2, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein. Some or all of these operations might also be performed by components other than those specifically identified.

The routine 200 begins at operation 202, where the issue investigation system 118 receives an investigation request 120. As described above, the investigation request 120 identifies a particular unresolved issue 122 for which an investigation should be performed and one or more corrective actions taken. The investigation request 120 might provided to the issue investigation system 118 by way of an appropriate UI, through an API, or in another manner.

From operation 202, the routine 200 proceeds to operation 204, where the issue investigation system 118 obtains data describing the characteristics of the unresolved issue 122 with the software component 106. As discussed with regard to FIG. 1, for example, the issue investigation system 118 might obtain unresolved issue data 114 from the issue tracking system 110 associated with the unresolved issue 122. The issue investigation system 118 might also obtain other types of data describing various characteristics of the unresolved issue 122 from another system, component, or location.

From operation 204, the routine 200 proceeds to operation 206, where the issue investigation system 118 obtains data describing the characteristics of one or more issues with the software component 106, or with another software component, that have been previously resolved. As discussed above, for example, the issue investigation system 118 might obtain the resolved issue data 116 from the issue tracking system 110 for the software component 106 and/or for one or more other software components. The issue investigation system 118 might also obtain other types of data describing resolved issues from another system, component, or location.

From operation 206, the routine 200 proceeds to operation 208, where the issue investigation system 118 utilizes the data obtained at operations 204 and 206 to identify resolved issues that are similar to the unresolved issue 122 identified in the recommendation request 120. As discussed above, for example, the issue investigation system 118 may compare some or all of the characteristics of the unresolved issue 122 to the corresponding characteristics associated with previously resolved issues to compute a measure of the similarity between the unresolved issue 122 and the resolved issues. In this way, resolved issues can be identified that are similar to the unresolved issue 122. In some embodiments, only resolved issues having at least a threshold level of similarity with the unresolved issue 122 are identified and/or considered further in the manner described below.

Once the issue investigation system 118 has identified resolved issues that are similar to the unresolved issue 122, the routine 200 proceeds from operation 208 to operation 210. At operation 210, the issue investigation system 118 identifies changes 108 that were made in order to resolve previously resolved issues that are similar to the unresolved issue 122. These changes 108 may be identified in an investigation recommendation 124 in some embodiments. The changes 108 might also be utilized when taking the other types of corrective actions described herein.

In some embodiments, the routine 200 proceeds from operation 210 to operation 212, where the issue investigation recommendation system 118 computes the similarity between each of the changes 108 identified at operation 210 (i.e. the changes 108 that were made in order to resolve each previously resolved issue that is similar to the unresolved issue 122). As discussed above, for example, the issue investigation system 118 might compute the similarity between the changes 108 identified at operation 210 based upon the files associated with an issue that were changed in order to resolve the issue, the lines of program code that were changed in order to resolve an issue, the changes made to resolve the issue, software classes that were changed to resolve an issue, the identity of the developer associated with an issue, and/or other metadata associated with an issue.

From operation 212, the routine 200 proceeds to operation 214, where the issue investigation system 118 may take one or more corrective actions based upon the changes 108 identified above at operations 210 and 212. For instance, the issue investigation system 118 might generate an investigation recommendation 124 that identifies the changes 108 that are similar to one another. The investigation recommendation 124 might identify changes 108 that have a similarity with one another that is greater than a certain pre-defined threshold. The changes 108 might also be ordered in the investigation recommendation 124 based upon their similarity with one another and/or based upon the similarity between the unresolved issue 122 and the resolved issues associated with the identified changes 108. As discussed above, the investigation recommendation 124 might be provided to a developer by way of an email message, a Web page, a suitable UI, an API call response, or in another manner. The developer can then examine the changes 108 identified in the investigation recommendation 124 as being possible resolutions to the unresolved issue 122.

As also discussed above, one or more other unresolved issues that are similar to the unresolved issue 122, and that have at least one associated change 108, might also be identified and presented in the recommendation 124. The recommendation 124 might also identify one or more changes 108 made subsequent to a change 108 that resulted in the resolution of an issue. In this way, a developer can quickly identify changes made to a particular software component 108 following the resolution of an issue within the software component 108. The developer may then utilize the identified changes in the investigation of the unresolved issue 122.

As discussed above, the issue investigation system 118 might take other corrective actions in addition to or other than providing an investigation recommendation 124. For example, and as discussed in detail above, the issue investigation system 118 might assign the unresolved issue to a developer that resolved a similar previously resolved issue in the issue tracking system 110, might generate a commit request 128 to commit the changes 108 made to resolve the previously resolved issue to the unresolved issue 122, and/or might cause one or more automated tests to be performed in order to determine if the changes 108 made to resolve the previously resolved issue also resolve the unresolved issue 122. Other corrective actions might also be performed. From operation 214, the routine 200 proceeds to operation 216, where it ends.

Figure 3:
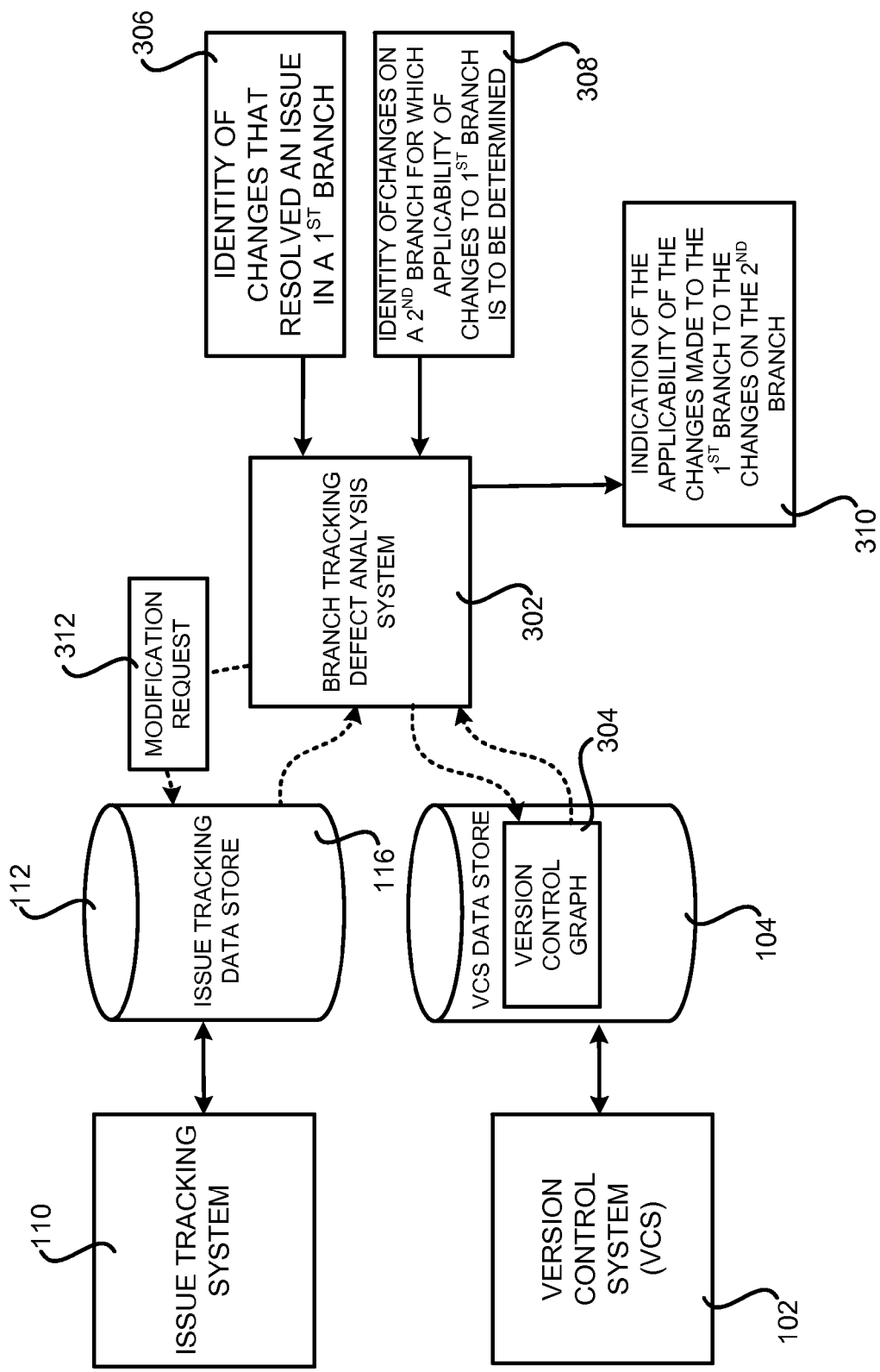
FIG. 3 is a system diagram showing aspects of a mechanism disclosed herein for determining if a change made to resolve an issue in one branch of a software component is relevant to another branch of the software component, according to one embodiment.

FIG. 3 is a system diagram showing aspects of a mechanism disclosed herein for determining if a change made to resolve an issue in one branch of a software component 106 is applicable to another branch of the software component 106, according to one embodiment. As shown in FIG. 3, the VCS 102 maintains a version control graph 304 for a software component 106 in some implementations. The version control graph 304 is a directed acyclic graph that identifies changes made to different branches of the software component 106 and the relationships between them. For example, the version control graph 304 might identify linear sequences of changes to the software component 106 along each branch. As will be described in greater detail below, the version control graph 304 may be utilized to determine when a change made to a first branch of the software component 106 may also be applicable to a point in a second branch of the software component 106.

Figure 4:
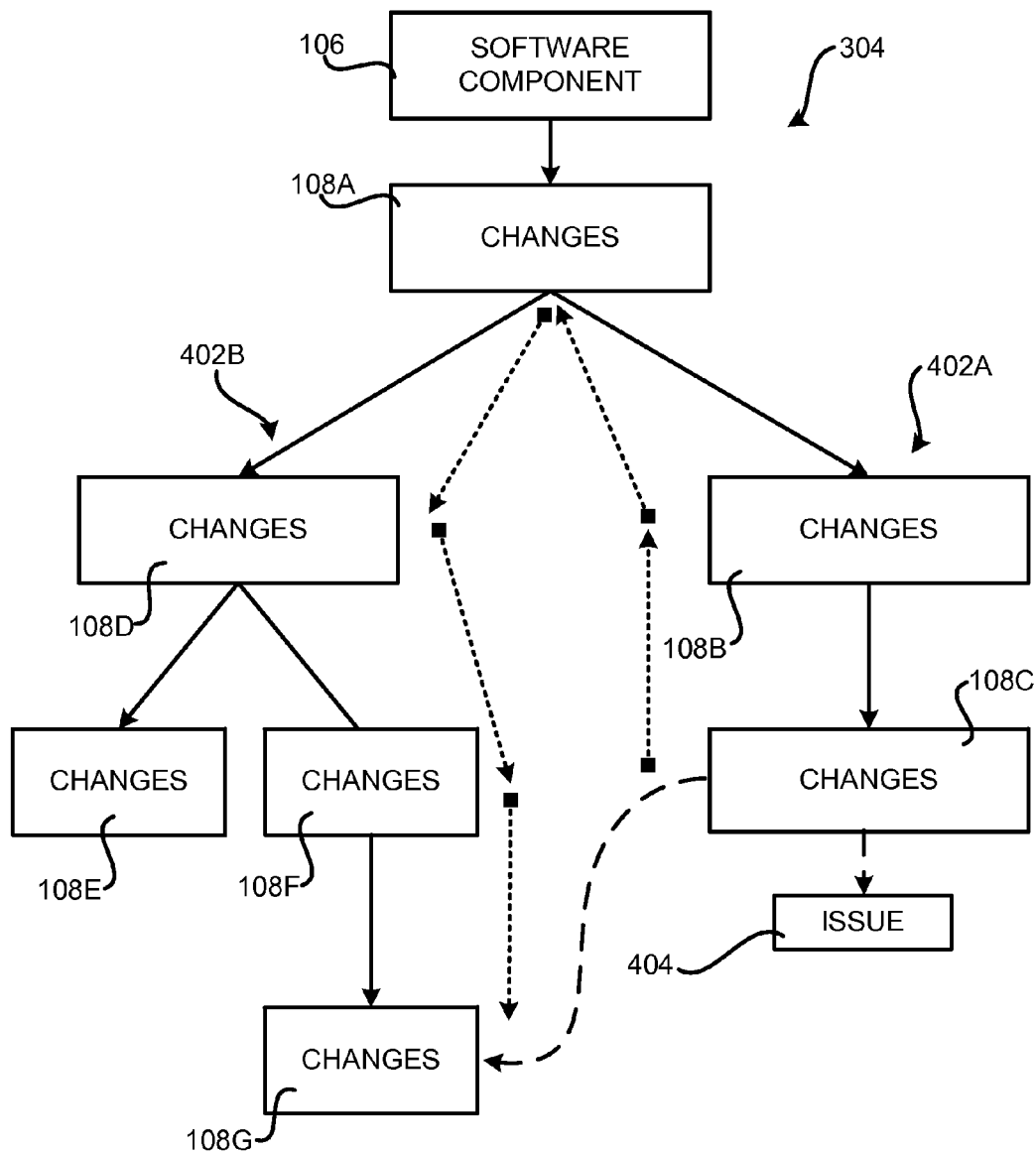
FIG. 4 is a graph diagram showing an illustrative version control graph utilized in embodiments to maintain associations between various branches of a software component.

Turning now momentarily to FIG. 4, an illustrative version control graph 304 will be described. As discussed briefly above, the VCS 102 might maintain a version control graph 304 that identifies sequences of changes made to a software component 106. For instance, in the example shown in FIG. 4, the version control graph 304 identifies a number of changes 108A-108G made to the software component 106. The version control graph 304 also maintains data identifying the relationships between the changes 108A-108D. In FIG. 4 the arrows between the changes 108A-108G represent these relationships. For example, the arrow between the changes 108A and 108B indicates that a branch 402A was taken. The arrow between the changes 4108B and 108C indicates that additional changes were made to the branch 402A. Similarly, the arrow between the changes 108A and 108D indicate that a second branch 402B was created. An appropriate data structure, or data structures, might be utilized to store a representation of the changes 108 and the branches 402.

In the example version control graph 304 shown in FIG. 4, the branch 402A has had one or more changes 108C made thereto that resolved an issue 404 with the software component 106. For example, and without limitation, the changes 108C might be changes to source code contained in the branch 402A that resolved the issue 404. The issue tracking system 110 might maintain an association between the changes 108C and the issue 404 in the software component 106 that was resolved by the changes 108C.

An automated mechanism is disclosed herein for determining whether a change, or changes, made to resolve an issue within one branch 402 of the version control graph 304 might also be relevant to another branch 402 in the version control graph 304. For instance, in the example shown in FIG. 4, a determination is being made as to whether the changes 108C made to the branch 402A to resolve the issue 404 are also applicable to the branch 402B. If the changes 108C are applicable to the branch 402B, then the changes 108C might be automatically applied to the branch 402B, an entry might be created in the issue tracking system 110 associating the issue 404 with the branch 402B, and/or other types of actions might be taken. If the changes 108C are not applicable to the branch 402B, then an entry in the issue tracking system 110 associating with issue 404 with the branch 402B might be deleted (if one exists) and/or other types of actions might be taken. Additional details regarding this process will be provided below.

Returning now to FIG. 3, additional details will be provided regarding the mechanism disclosed herein for determining if changes made to resolve an issue in one branch of a software component 106 are applicable to another branch of the software component 106. As shown in FIG. 3, a branch tracking defect analysis system 302 is configured in one implementation to provide the functionality disclosed herein for determining if changes 108 made to resolve an issue 404 in one branch 402 of a software component 106 are applicable to another branch 402 of the software component 106. It should be appreciated, however, that this functionality might be provided by the VCS 102, by the issue tracking system 110, or by another component or system altogether.

In order to determine if one or more changes 108 made to one branch 402 of a software component 106 are applicable to another branch 402 of the software component 106, the branch tracking defect analysis system 302 might first receive the identity 306 of changes 108 that resolved an issue 108 in one branch of the software component 106. For instance, using the example version control graph shown in FIG. 4, a user might identify the changes 108C to the branch 402A that resolved the issue 404. An appropriate UI, API, or other type of interface might be provided through which a user can specify the identity 306 of the changes 108 that resolved the issue 404. Alternatively, the user might specify an issue 404 that was resolved by the changes 108. The branch 402 of the software component 106 that contains the identified changes 108 for resolving an issue 404 may be referred to herein as the "source branch."

A user might also specify the identity 308 of a location within another branch 402 of the software component 106 for which a determination is to be made as to whether the changes 108 in the source branch are applicable. The user might be permitted to specify one or multiple branches 402 for which such a determination is to be made. The branch 402 of the software component 106 for which a determination is to be made as to whether a change 108 to another branch is relevant may be referred to herein as the "target branch." An appropriate UI, API, or other type of interface might be provided through which a user can specify the identity 308 of one or more target branches 402 and specific locations in the target branches 402.

In order to determine whether a change 108 to a source branch is applicable to a point within a target branch of the software component, the branch tracking defect analysis system 302 is configured in one embodiment to identify changes in the version control graph 304 that are common to both the source and target branches. The common changes are changes in the version control graph 304 from which both the source branch and the target branch derive. For example, in the version control graph 304 shown in FIG. 4, the source branch is the branch 402A, the target branch is the branch 402B, and the common changes are the changes 108A.

Once the branch tracking defect analysis system 302 has identified the common changes, the branch tracking defect analysis system 302 traverses the version control graph 304 to collect a linear sequence of changes 108 from the changes 108 in the source branch that resolved the issue 404 to the common changes. This traversal is indicated in FIG. 4 by dotted lines. The direction of the arrows on the dotted lines indicates the direction of the traversal of the version control graph 304. For instance, in the example shown in FIG. 4, a linear sequence of changes 108 is collected that includes the changes 108C, the changes 108B, and the common changes 108A.

The branch tracking defect analysis system 302 analyzes the collected linear sequence of changes 108 to determine the impact, if any, of the changes 108 on the relevance of the change 108 that resolved the issue 404 to the specified point in the target branch. For instance, in the example version control graph 304 shown in FIG. 4, the path from the changes 108C to the common changes 108A is traversed and the changes 108C, 108B, and 108A are examined to determine their impact, if any, on the applicability of the change 108C to the point in the target branch 402B including the changes 108G. Along the path from the changes 108 that resolved the issue 404 to the common changes, the branch tracking defect analysis system 302 may examine the reverse transformation of the changes 108 to determine the impact, if any, on the applicability of the change 108 in the source branch to specified point in the target branch. In this way, the changes 108 to the source branch may be transformed to their nearest equivalent as they would be applied to the specified location in the target branch.

The branch tracking defect analysis system 302 also traverses the version control graph 304 from the common changes to the specified point in the target branch 402B to collect a linear sequence of changes 108 along this path. The branch tracking defect analysis system 302 analyzes the collected linear sequence of changes 108 along this path determine the impact, if any, of the changes 108 on the applicability of the change 108 associated with the source branch to the specified point in the target branch. For instance, in the example version control graph 304 shown in FIG. 4, the path from the common changes 108A to the changes 108G is also traversed, and the changes 108A, 108D, 108F, and 108G are analyzed to determine their impact, if any, on the applicability of the change 108C to the point in the target branch 402B represented by the changes 108G.

In order to determine the impact of the linear sequences of changes described above on the applicability of the change made to the source branch to the target branch, the branch tracking defect analysis system 302 may examine the nature of the changes in the linear sequences of changes. For example, if source code that encompasses the change to the source branch is modified at an earlier point in time, it may reduce the applicability to the target branch of the change made to the source branch. Similarly, changes made to portions of source code other than the portion containing the change made to the source branch might not have any impact on the applicability of a change to the target branch. In this regard, it should be appreciated that changes made to a textual model (i.e. source code) and/or a programmatic model might be analyzed along the paths from the changes in the target branch to the common changes and from the common changes to the specified point in the target branch.

In some embodiments, a transformed change 108 to a source branch that modifies files or other resources that are not present in the target branch will be considered inapplicable to the target branch. Similarly, a transformed change 108 to a source branch that introduces a dependency on a component that is non-existing or not being used in the target branch will similarly be considered inapplicable to the target branch. Likewise, if the transformed change references incompatible fields or methods in the target branch, then the change will be considered inapplicable to the target branch. If merging the transformed change into the target branch would create an inconsistency in the target branch, then the change will also be considered inapplicable to the target branch.

In some embodiments, the changes 108 made along the path from the changes in the source branch to the common changes and from the common changes to the specified point in the target branch are analyzed. In other embodiments, some of the changes 108 along the paths may be skipped. In this regard, a user might be permitted to specify various preferences regarding the manner in which the path from the changes in the source branch to the common changes and from the common changes to the specified point in the target branch is traversed.

Based upon the traversal of the version control graph 304 from the changes in the source branch to the common changes and from the common changes to the specified point in the target branch, the branch tracking defect analysis system 302 can determine whether the change 108 made to the source branch may be applicable to the target branch. If the change 108 made to the source branch is applicable to the target branch, the branch tracking defect analysis system 302 might cause one or more actions to be taken. For example, and without limitation, the branch tracking defect analysis system 302 might cause the VCS 102 to automatically apply the change previously made to the source branch to the target branch. For instance, the change 108C might be applied to the changes 108G in the branch 402B in the example version control graph 304 shown in FIG. 4. Alternatively, the branch tracking defect analysis system 302 might submit a modification request 312 to the issue tracking system 110 to create a new entry for the issue 404 in the issue tracking system 110 for the target branch. The new entry corresponds to the issue 404 in the source branch that was resolved by the identified change (i.e. the changes 108C in FIG. 4). The branch tracking defect analysis system 302 might also cause other actions to be taken in response to determining that the change 108 made to the source branch may also be applicable to the target branch.

If the branch tracking defect analysis system 302 determines that the change 108 made to the source branch 402 is not applicable to the target branch 402, the branch tracking defect analysis system 302 might also cause one or more actions to be taken. For example, and without limitation, the branch tracking defect analysis system 302 might submit a modification request 312 to cause an entry to be closed in the issue tracking system 110 for the issue that is associated with the target branch 402. The branch tracking defect analysis system 302 might also cause other actions to be taken in response to determining that the change 108 made to the source branch is not applicable to the target branch. Additional details regarding this process will be provided below with regard to FIG. 5.

Figure 5:
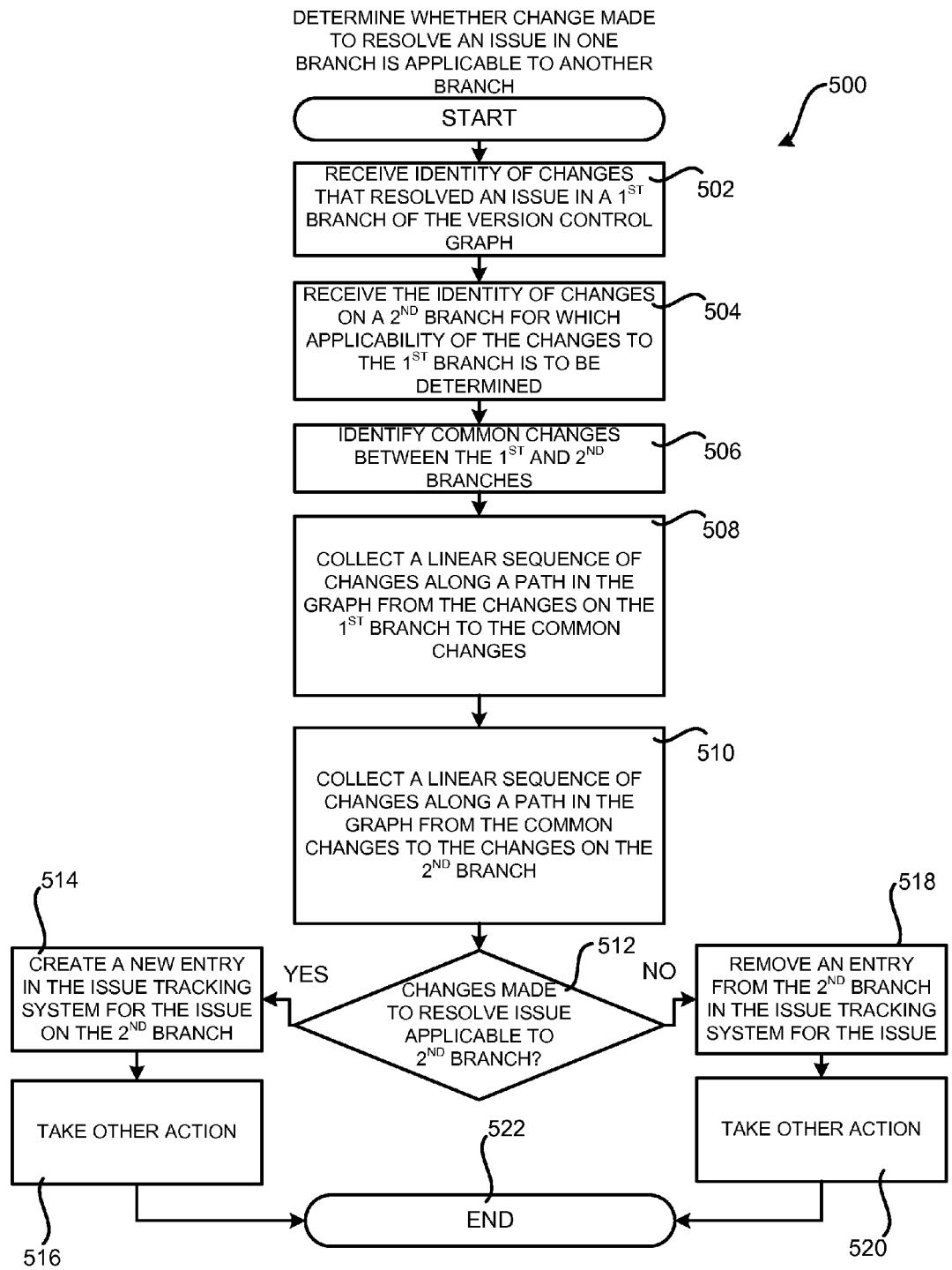
FIG. 5 is a flow diagram showing aspects of one routine disclosed herein for determining if a change made to resolve an issue in one branch of a software component is relevant to another branch of the software component.

FIG. 5 is a flow diagram showing aspects of one routine 500 disclosed herein for determining if one or more changes 108 made to resolve an issue in one branch 402 of a software component 106 are applicable to another branch 402 of the software component 106. The routine 500 begins at operation 502, where the branch tracking defect analysis system 302 receives the identity 306 of a change, or changes 108, that resolved an issue 404 in a branch 402 (i.e. the source branch) of the version control graph 304. As mentioned above, the identity 306 of the changes 108 might be specified through a UI, an API, or in another manner.

From operation 502, the routine 500 proceeds to operation 504, where the branch tracking defect analysis system 302 receives the identity 308 of a point (e.g. changes 108) in another branch 402 (i.e. the target branch) in the version control graph 304 for which the applicability of the changes 108 identified at operation 502 is to be determined. As mentioned above, the identity 308 of the location in the target branch 402 for which the applicability of the changes 108 made in the source branch is to be determined might be specified through a UI, an API, or in another manner.

From operation 504, the routine 500 proceeds to operation 506, where the branch tracking defect analysis system 302 identifies common changes for the specified changes in the source branch and the target branch. As mentioned above, the common changes are changes in the version control graph 304 from which both the source branch and the target branch derive.

Once the common changes have been identified, the routine 500 proceeds from operation 506 to operation 508, where the branch tracking defect analysis system 302 collects a linear sequence of changes 108 along a path in the version control graph 304 from the changes 108 made in the source branch to the common changes. The branch tracking defect analysis system 302 evaluates the collected linear sequence of changes 108 to determine the impact, if any, of the linear sequence of changes 108 on the relevance of the change 108 made to the source branch to the target branch.

From operation 508, the routine 500 proceeds to operation 510, where the branch tracking defect analysis system 302 collects a linear sequence of changes 108 along a path in the version control graph 304 from the common changes to the specified location in the target branch (e.g. the changes 108G in the example shown in FIG. 4). The branch tracking defect analysis system 302 evaluates the linear sequences of changes along the path between the common changes and the specified location in the target branch to determine the impact of the linear sequence of changes on the applicability to the target branch of the changes 108 made to the source branch.

From operation 510, the routine 500 proceeds to operation 512, where the branch tracking defect analysis system 302 determines, based upon the linear sequences of changes collected in the manner described above with regard to operations 508 and 510, whether the changes 108 made to the source branch are applicable to the specified location in the target branch. If the changes 108 made to the source branch are applicable to the target branch, the routine 500 proceeds from operation 512 to operation 514. At operation 514, a new entry may be created in the issue tracking system 110 on the target branch that corresponds to the issue with the source branch that was resolved by the changes 108 to the source branch.

From operation 514, the routine 500 proceeds to operation 516, where the branch tracking defect analysis system 302 might cause one or more other actions to be taken in response to determining that the changes 108 made to the source branch are applicable to the target branch. For example, and without limitation, the branch tracking defect analysis system 302 might cause the VCS 102 to apply the changes 108C that resolved the issue 404 with the source branch directly to the appropriate location within the target branch. Other types of actions might also be taken in other implementations.

If, at operation 512, the branch tracking defect analysis system 302 determines that the changes 108 made to the source branch are not applicable to the target branch, the routine 500 proceeds to operation 518. At operation 518, the branch tracking defect analysis system 302 might cause the issue tracking system 110 to close an entry from the target branch, if one exists, for the same issue that is in the source branch. In this way, an entry in the issue tracking system 110 can be closed with regard to the target branch if the issue is determined not to be applicable to that branch. The routine 500 then proceeds from operation 518 to operation 520, where the branch tracking defect analysis system 302 might cause other actions to be taken in response to determining that changes made to a source branch are not applicable to another branch in the version control graph 304. From operations 516 and 520, the routine 500 proceeds to operation 522, where it ends.

It should be appreciated that the mechanism described above with reference to FIGS. 3-5 might be utilized in an automated process for testing the applicability of changes made to any branch 402 in a version control graph 304 to each of the other branches 402 in the version control graph 304. For example, a process might be executed that enumerates through each of the issues 404 in the version control graph 304 and performs the process described above with regard to FIGS. 3-5 for each of the issues 404 and each of the changes within the branches 402 in the version control graph 304. In this way, various locations within the branches 402 to which each issue 404 may be applicable might be identified. Conversely stated, given a location in a branch 402 in the version control graph 304, all of the known issues 404 that might be applicable to that location may be determined. In some embodiments, some or all of these processes might be automatically executed in response to the submission of a change 108 that resolves an issue 404 in a branch 402 of the version control graph 304.

Figure 6:
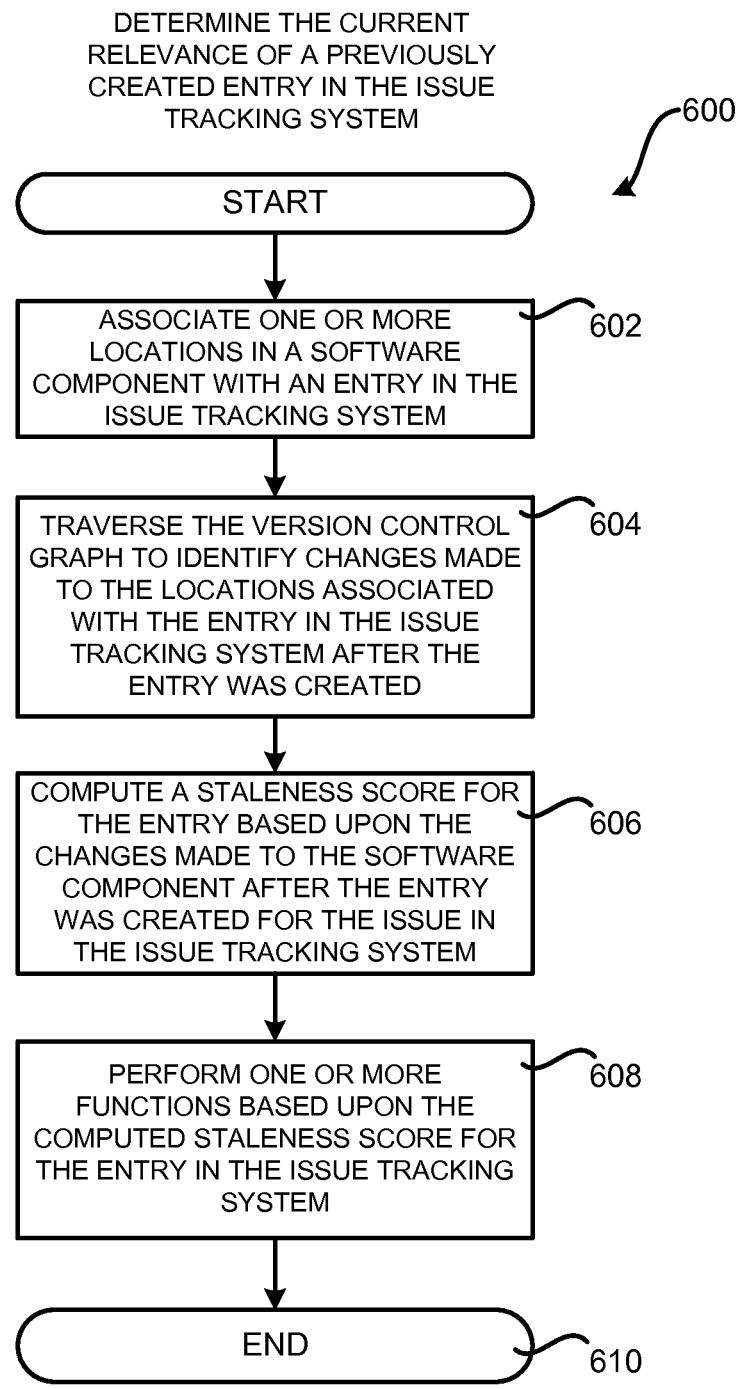
FIG. 6 is a flow diagram showing aspects of one routine disclosed herein for determining the relevance of a previously created entry in an issue tracking system for an issue with a software component, according to one embodiment.
Figure 7:
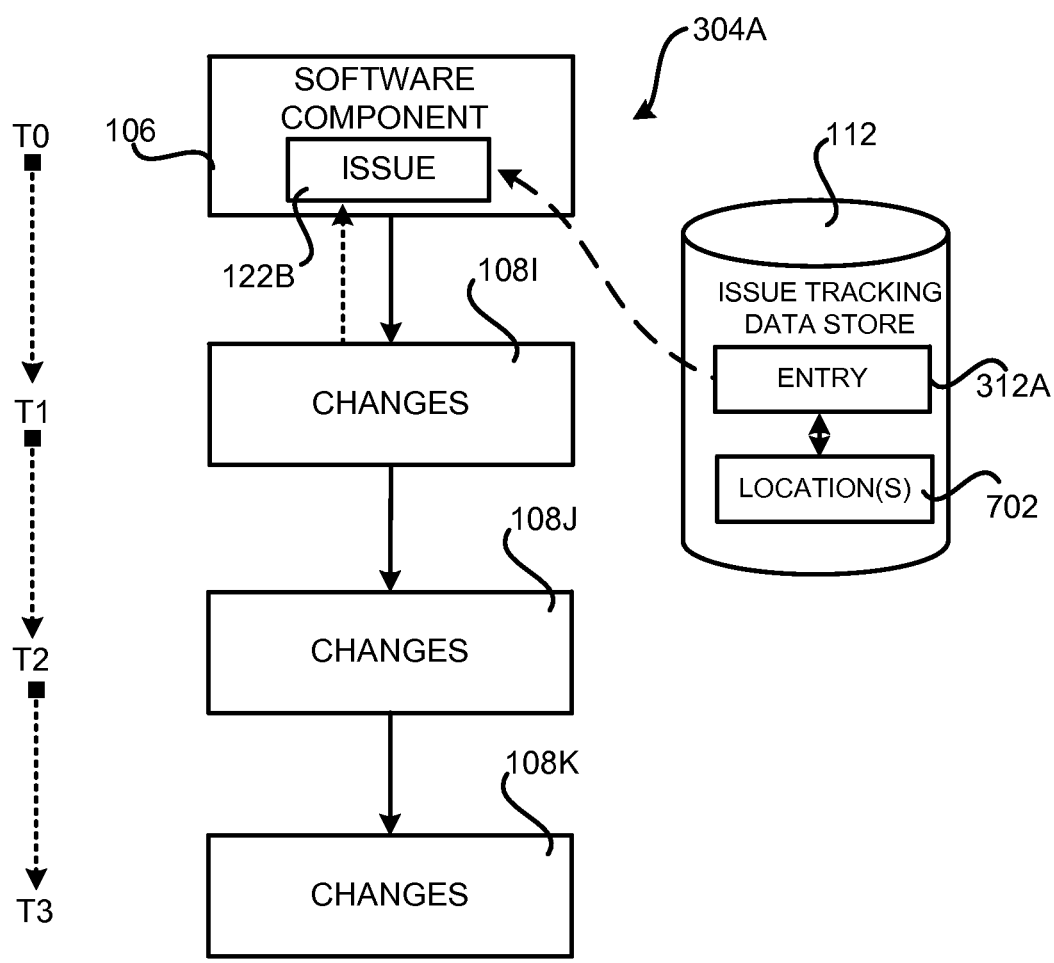
FIG. 7 is a graph diagram showing an sample version control graph utilized in one embodiment disclosed herein for computing the relevance of an entry in an issue tracking system at a point in time after the entry is created.

Turning now to FIGS. 6 and 7, details will be provided regarding a mechanism presented herein for calculating the relevance of an entry in the issue tracking system 110 at a point in time after the entry is created. As described above, the issue tracking system 110 provides functionality for creating and managing entries corresponding to issues in a software component 106. For example, and as illustrated in the version control graph 304A shown in FIG. 7, an entry 312A might be created by the issue tracking system 110 and stored in the issue tracking data store 112 for an issue 122B identified in the software component 106. As also described above in detail, the entries maintained by the issue tracking system 110 may contain various types of information regarding an associated issue.

The mechanism described herein with regard to FIGS. 6 and 7 allows the relevance of an entry in the issue tracking system 110, such as the entry 312A, to be computed at a point in time after the entry has been created. This may be useful, for instance, where changes made to the software component 106 after an entry has been created for an issue in the software component 106 might reduce the relevance of the issue to the current state of the software component 106. For example, in the version control graph 304A shown in FIG. 7, an entry 312A has been created in the issue tracking system 110 for an issue 122B at a certain point in time (indicated as T0 in FIG. 7).

At some point in time (shown as T1 in FIG. 7) after the creation of the entry 312A, changes 108I are made to the software component 106. The changes 108I might reduce the relevance of the entry 312A to the software component 106. Alternately, the changes 108I might have no impact on the relevance of the entry 312A (and the associated issue 122B). It may, however, be difficult for a developer to know whether the entry 312A is still relevant following the changes 108I.

At a later point in time (indicated as T2 in FIG. 7), additional changes 108J might also be made to the software component 106. In this example, it may be even more difficult to determine whether the entry 312A in the issue tracking system 110 (and the associated issue 122B) is still relevant following the changes 108I and 108J to the software component 106. Other changes 108K made at an even later time (indicated as T3 in FIG. 7) might make it even more difficult for a developer to understand the relevance of the entry 312A for the issue 122B to the current state of the software component 106.

The mechanism described in detail below with regard to FIGS. 6 and 7 allows the relevance of the issue 312A to be determined at a point in time after an entry 312A for the issue 122B has been created in the issue tracking system 110. For example, using the mechanism described below, the relevance of the entry 312A (and the associated issue 122B) may be determined following the changes 108I, 108J, and/or 108K. Various types of actions may then be taken based upon the computed relevance.

FIG. 6 is a flow diagram showing aspects of a routine 600 disclosed herein for determining the relevance of a previously created entry, such as the entry 312A, in the issue tracking system 110 for an issue 122 with a software component 106, according to one embodiment. The routine 600 begins at operation 602, where an entry, such as the entry 312A, is created in an issue tracking system 110. Additionally, one or more locations 702 are associated with the entry 312A.

The locations 702 refer to locations in the software component 106 that may be relevant to the associated issue 122. For example, and without limitation, the locations 702 might refer to one or more files within the software component 106, a line of source code, or a range of lines of source code within the software component 106. A user may be permitted to specify the locations 702, or the locations 702 might be identified automatically based upon characteristics of the associated issue 122. For example, the locations 702 might be identified based upon stack traces associated with the entry 312A. The locations 702 might also be identified based upon particular lines of source code in the software component 106 that were modified prior to the creation of the entry 312A. As will be described in greater detail below, changes made to the locations 702 associated with an entry 312A may be analyzed to determine the relevance of an entry 312 to a software component 106 at some point in time after the entry 312 has been created in the issue tracking system 110.

From operation 602, the routine 600 proceeds to operation 604, where changes 402 made to locations 702 associated with the entry 312 after the point in time at which the entry 312 was created are identified. In one particular embodiment, for example, the version control graph 304 may be traversed in order to identify the changes 108 made to the specified locations 702 within the software component 106 after creation of the entry 312. For instance, in the example shown in FIG. 7, the current relevance of the entry 312A may be determined by analyzing the changes 108I, 108J, and 108K, if any, to the locations 702 associated with the entry 312A.

From operation 604, the routine 600 proceeds to operation 606, where a "staleness" score is computed based upon the changes 108 made to the locations 702 in the software component 106 following the creation of the entry 312A for the issue 122B. As mentioned briefly above, the staleness score provides a measure of the relevance of the entry 312A in the issue tracking system 110 at a point in time after the entry 312A was created. In the example shown in FIG. 7, for instance, the computed staleness score may be computed in a manner to provide a measure of the current relevance of the entry 312A. The staleness score might similarly be computed for other points in time.

The types and quantity of changes 108 made to the specified locations 702 of the software component 106 impact the staleness score. For example, and without limitation, significant changes made to the specified locations 702 may decrease the relevance of the entry 312A and, therefore, increase the staleness score. Very minor changes to the locations 702, or changes made to other portions of the software component 106 other than the specified locations 702, might have little or no impact on the staleness score. Each of the changes 108 identified in the version control graph 304 from the point in time at which the entry 312A was created (e.g. T0 in FIG. 7) through the point in time at which an indication of relevance is desired (e.g. T1, T2 or T3 in FIG. 7) may be evaluated and used in the computation of the staleness score. A subset of the changes 108 might also be evaluated to compute the staleness score at another point in time.

From operation 606, the routine 600 proceeds to operation 608, where one or more functions, or actions, may then be performed based upon the staleness score computed at operation 606. For example, and without limitation, if the staleness score indicates that the entry 312A is not likely to be relevant to the software component 106 at a certain point in time, the entry 312A may be closed in the issue tracking system 110. In this case, a threshold value (i.e. a threshold level of relevance) may be set for use in determining if an entry 312A is to be closed in the issue tracking system 110. For example, an entry may be closed in the issue tracking system 110 if the computed staleness score meets (e.g. exceeds) a certain preset threshold relevance value.

In other embodiments, the locations 702 associated with an entry 312A might be modified based upon the computed staleness score. For example, if the computed staleness score indicates that an entry 312A is no longer relevant, but the issue 122B still exists in the relevant branch 402, then the locations 702 might be modified to reflect another location, or locations, within the software component 106. A user might also be permitted an opportunity to specify and/or modify the locations 702.

In other embodiments, a priority associated with the entry 312A in the issue tracking system 110 might be modified based upon the computed staleness score. For example, and without limitation, the issue tracking system 110 might be utilized to assign each entry 312 associated with the software component 106 a priority score indicating whether the entry 312 is low priority, high priority, or another priority. Based upon the computed staleness score for an entry 312, the priority associated with the entry 312 might be adjusted. For example, if the staleness score indicates that an entry 312A is no longer relevant, the priority of the entry 312A might be adjusted from high priority to low priority. In some cases setting the priority to the lowest possible value might result in the closure of the entry 312A. The priority associated with an entry 312 might also be adjusted in other ways based upon the computed staleness score.

In other embodiments, a "triage" action may be requested in response to determining that the computed staleness score meets a specified threshold. For example, the entry 312A for an issue 122B might be modified in order to signal a developer or other personnel to evaluate the issue 122B in response to determining that the staleness score for the entry 312A meets a predefined threshold. Other types of notifications might also be provided in order to signal a developer or other personal to evaluate the relevance of the issue 122B.

In some embodiments, a UI is also provided for presenting the staleness score to a user. Based upon the presented staleness score, the user may then be permitted to close and/or modify an entry 312 and/or the associated locations 702, adjust the priority associated with an entry 312, and/or take other types of actions based upon the staleness score. In this regard, it should be appreciated that other types of actions might also be taken in place of or in addition to those specifically mentioned herein based upon a computed staleness score. In addition, it should be appreciated that various types of events might trigger the process illustrated in FIG. 6. For example, and without limitation, changes 108 checked in to the VCS 102 might trigger the process described above in order to determine the applicability of any existing entries 312 to the modified program code. Other types of events might also initiate the mechanism shown in FIG. 6. From operation 608, the routine 600 proceeds to operation 610, where it ends.

Figure 8:
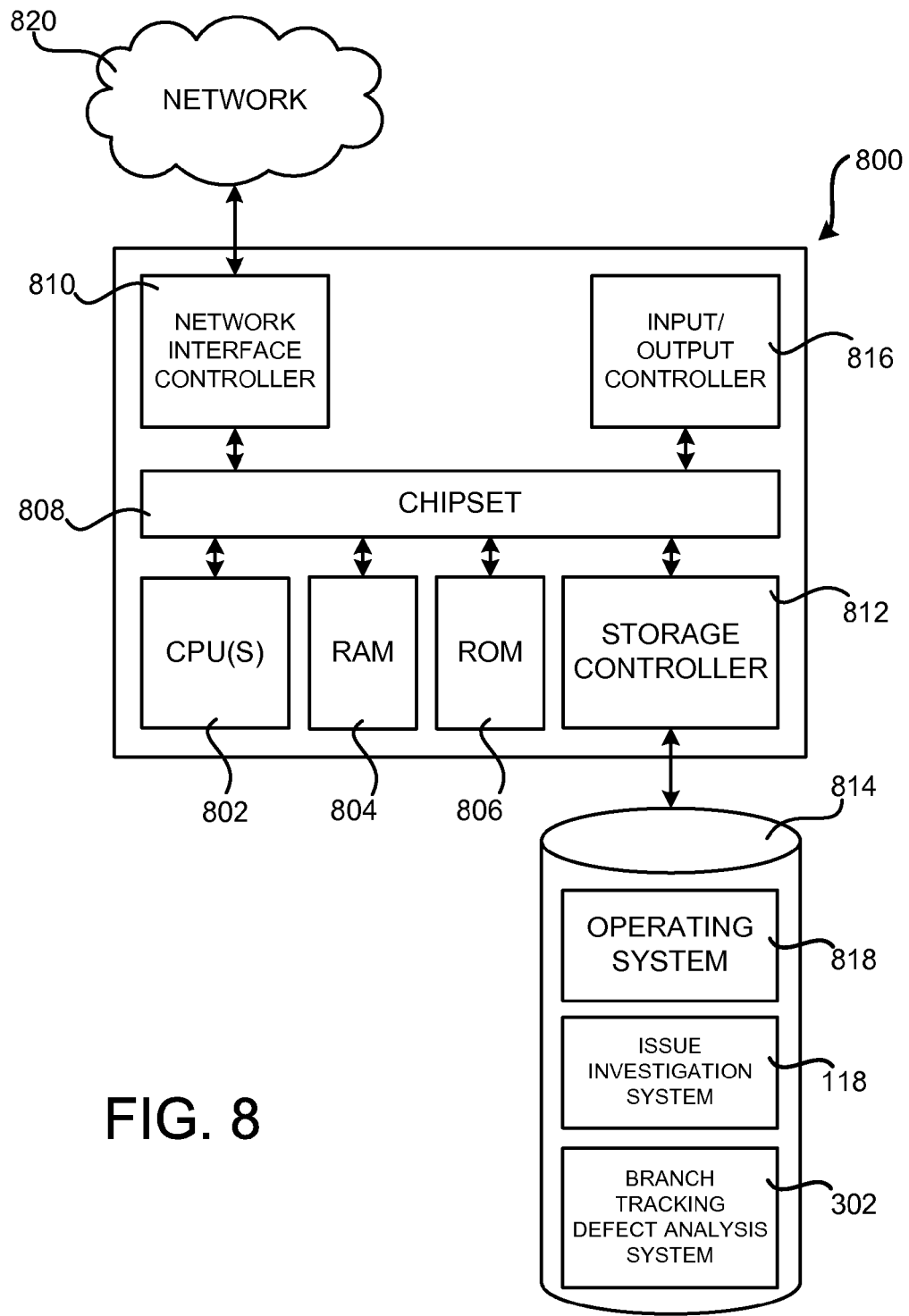
FIG. 8 is a computer architecture diagram showing an illustrative computer hardware architecture for computing devices described in embodiments presented herein.

FIG. 8 shows an example computer architecture for a computer 800 capable of executing the software components described herein. The computer architecture shown in FIG. 8 illustrates a conventional server computer, workstation, desktop computer, laptop, network appliance, personal digital assistant ("PDA"), electronic book reader, digital cellular phone, or other computing device, and may be utilized to execute any aspects of the software components presented herein. For example, and without limitation, the computer architecture shown in FIG. 8 might be utilized to implement computer systems that execute software components for implementing the functionality provided by the VCS 102, the issue tracking system 110, the issue investigation recommendation system 118, and/or the branch tracking defect analysis system 302.

The computer 800 includes a baseboard, or "motherboard," which is a printed circuit board to which a multitude of components or devices may be connected by way of a system bus or other electrical communication paths. In one illustrative embodiment, one or more central processing units ("CPUs") 802 operate in conjunction with a chipset 808. The CPUs 802 are standard programmable processors that perform arithmetic and logical operations necessary for the operation of the computer 800.

The CPUs 802 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 808 provides an interface between the CPUs 802 and the remainder of the components and devices on the baseboard. The chipset 808 may provide an interface to a random access memory ("RAM") 804, used as the main memory in the computer 800. The chipset 808 may further provide an interface to a computer-readable storage medium such as a read-only memory ("ROM") 806 or non-volatile RAM ("NVRAM") for storing basic routines that help to startup the computer 800 and to transfer information between the various components and devices. The ROM 806 or NVRAM may also store other software components necessary for the operation of the computer 800 in accordance with the embodiments described herein.

According to various embodiments, the computer 800 may operate in a networked environment using logical connections to remote computing devices and computer systems through the network 820, such as a local-area network ("LAN"), a wide-area network ("WAN"), the Internet, or any other networking topology known in the art that connects the computer 800 to remote computers. The chipset 808 includes functionality for providing network connectivity through a network interface controller ("NIC") 810, such as a gigabit Ethernet adapter. The NIC 810 is capable of connecting the computer 800 to other computing devices over the network 820. It should be appreciated that any number of NICs 810 may be present in the computer 800, connecting the computer 800 to various types of networks and remote computer systems.

The computer 800 may be connected to a mass storage device 814 that provides non-volatile storage for the computer 800. The mass storage device 814 may store system programs, application programs, other program modules, and data, which are described in greater detail herein. The mass storage device 814 may be connected to the computer 800 through a storage controller 812 connected to the chipset 808. The mass storage device 814 may consist of one or more physical storage units. The storage controller 812 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 800 may store data on the mass storage device 814 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 814 is characterized as primary or secondary storage, and the like. For example, the computer 800 may store information to the mass storage device 814 by issuing instructions through the storage controller 812 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the mass storage device 814 by detecting the physical states or characteristics of one or more particular locations within the physical storage units.

In addition to the mass storage device 814 described above, the computer 800 may have access to other computer-readable storage media to store and retrieve information, such as program modules, data structures, or other data. It should be appreciated by those skilled in the art that computer-readable storage media can be any available non-transitory media that may be accessed by the computer 800. By way of example, and not limitation, computer-readable storage media may include volatile and non-volatile, removable and non-removable media implemented in any method or technology. Computer-readable storage media includes RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 814 may store an operating system 818 utilized to control the operation of the computer 800. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized. The mass storage device 814 may store other system or application programs and data utilized by the computer 800, such as the VCS 102, the issue tracking system 110, the issue investigation recommendation system 118, and/or the branch tracking defect analysis system 302, each of which was described above in regard to FIGS. 1-7.

In one embodiment, the mass storage device 814 or other computer-readable storage media may be encoded with computer-executable instructions that, when loaded into the computer 800, may transform the computer from a general-purpose computing system into a special-purpose computer capable of implementing the embodiments described herein. These computer-executable instructions transform the computer 800 by specifying how the CPUs 802 transition between states, as described above. According to one embodiment, the computer 800 may have access to computer-readable storage media storing computer-executable instructions that, when executed by the computer, perform the routines 200, 500 and 600 described above with regard to FIGS. 2, 5 and 6, respectively.

The computer 800 might also include an input/output controller 816 for receiving and processing input from a number of input devices, such as a keyboard, the mouse, a touchpad, a touch screen, an electronic stylus, or other type of input device. Similarly, the input/output controller 816 may provide output to a display, such as a computer monitor, a flat-panel display, a digital projector, a printer, a plotter, or other type of output device. It will be appreciated that the computer 800 may not include all of the components shown in FIG. 8, may include other components that are not explicitly shown in FIG. 8, or may utilize an architecture completely different than that shown in FIG. 8.

Based on the foregoing, it should be appreciated that various concepts and technologies for identifying and resolving software issues have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. An apparatus for determining whether a change made to a first branch of a software component to resolve an issue in the first branch of the software component is applicable to a second branch of the software component, the apparatus comprising:
   a processor; and
   a computer-readable storage medium having computer-executable instructions stored thereupon which, when executed by the processor, cause the apparatus to
      maintain a version control graph for the software component,
      identify common changes in the version control graph, the common changes comprising changes from which the first branch and the second branch both derive,
      collect a linear sequence of changes along a path in the version control graph from the change made to the first branch to the common changes,
      collect a linear sequence of changes along a path in the version control graph from the common changes to a change in the second branch, and
      based upon the collected linear sequences of changes, transform the change made to the first branch to a nearest equivalent as it would be applied to the second branch to determine whether the change made to the first branch of the software component to resolve the issue in the first branch is applicable to the second branch of the software component.

2. The apparatus of claim 1, wherein the change made to the first branch is considered inapplicable to the second branch if the transformed change modifies or introduces a dependency upon a resource that is not present in the second branch.

3. The apparatus of claim 1, wherein the change made to the first branch is considered inapplicable to the second branch if the transformed change creates an inconsistency in the second branch.

4. The apparatus of claim 1, wherein the change made to the first branch is considered inapplicable to the second branch if the transformed change references incompatible fields or methods in the second branch.

5. The apparatus of claim 1, wherein the computer-readable storage medium has further computer-executable instructions stored thereupon which, when executed by the processor, cause the apparatus to apply the change made to the first branch of the software component to the second branch of the software component in response to determining that the change made to the first branch of the software component to resolve the issue in the first branch is applicable to the second branch of the software component.

6. The apparatus of claim 1, wherein the computer-readable storage medium has further computer-executable instructions stored thereupon which, when executed by the processor, cause the apparatus to create a new entry in an issue tracking system for the issue that is associated with the second branch of the software component in response to determining that the change made to the first branch of the software component to resolve the issue in the first branch is applicable to the second branch of the software component.

7. The apparatus of claim 1, wherein the computer-readable storage medium has further computer-executable instructions stored thereupon which, when executed by the processor, cause the apparatus to close an entry from an issue tracking system for the issue that is associated with the second branch of the software component in response to determining that the change made to the first branch of the software component to resolve the issue in the first branch is not applicable to the second branch of the software component.

8. The apparatus of claim 1, wherein a version control system is configured to maintain the version control graph and to perform the identifying, collecting, and determining operations.

9. A computer-readable storage medium having computer-executable instructions stored thereon which, when executed by a computer, cause the computer to:
receive data identifying changes in a first branch of a version control graph for a software component,
receive data identifying a location in a second branch in the version control graph;
identify common changes in the version control graph, the common changes comprising changes in the version control graph from which both the first branch and the second branch derive;
collect changes associated with one or more branches of the version control graph from the changes to the first branch to the common changes and changes associated with one or more branches of the version control graph from the common changes to the location in the second branch; and
based upon the collected changes, transform the changes in the first branch to an equivalent as it would be applied to the second branch to determine if the changes in the first branch are also applicable to the second branch.

10. The computer-readable storage medium of claim 9, wherein the changes in the first branch comprises one or more changes to the first branch of the software component that resolves an issue in the first branch of the software component.

11. The computer-readable storage medium of claim 9, wherein the version control graph comprises a directed acyclic graph identifying one or more linear sequences of changes to the software component including at least the changes in the first branch, changes in the second branch and the common changes.

12. The computer-readable storage medium of claim 9, wherein the computer-readable storage medium has further computer-executable instructions stored thereon which, when executed by the computer, cause the computer to apply the changes in with the first branch to the second branch in response to determining that the changes in the first branch are applicable to the second branch.

13. The computer-readable storage medium of claim 9, wherein the computer-readable storage medium has further computer-executable instructions stored thereon which, when executed by the computer, cause the computer to create a new entry in an issue tracking system for the issue that is associated with the second branch in the version control graph in response to determining that the changes in the first branch are applicable to the second branch.

14. The computer-readable storage medium of claim 9, wherein the computer-readable storage medium has further computer-executable instructions stored thereon which, when executed by the computer, cause the computer to close an entry in an issue tracking system associated with the second branch in response to determining that the changes in the first branch are not applicable to the second branch.

15. A computer-implemented method for determining whether a change made to a first branch of a software component is applicable to a second branch of the software component, the method comprising:
collecting linear sequences of changes along a path from a change in a first branch of a version control graph to common changes and from the common changes to a change in a second branch of the version control graph; and
based upon the collected linear sequences of changes, transforming the change made to the first branch to an equivalent in the second branch to determine if the change made to the first branch of the version control graph is applicable to the second branch.

16. The computer-implemented method of claim 15, wherein the common changes comprise changes in the version control graph from which both the first branch and the second branch derive.

17. The computer-implemented method of claim 15, wherein the change in the first branch comprises a change to the first branch of the software component that resolves an issue in the first branch of the software component.

18. The computer-implemented method of claim 15, wherein the version control graph comprises a directed acyclic graph identifying one or more linear sequences of changes to the software component including at least the first change, the second change and the common changes.

19. The computer-implemented method of claim 15, wherein a version control system is configured to maintain the version control graph, collect the linear sequences of changes, and to evaluate the linear sequences of changes to determine if the change in the first branch is applicable to the second branch.

20. The computer-implemented method of claim 15, further comprising applying the change in the first branch of the software component to the second branch of the software component in response to determining by way of the collecting and evaluating that the change made to the first branch is applicable to the second branch.

* * * * *